April 3, 1934.  P. BRÜHL  1,953,550
ANTIFRICTION BEARING
Filed June 20, 1932
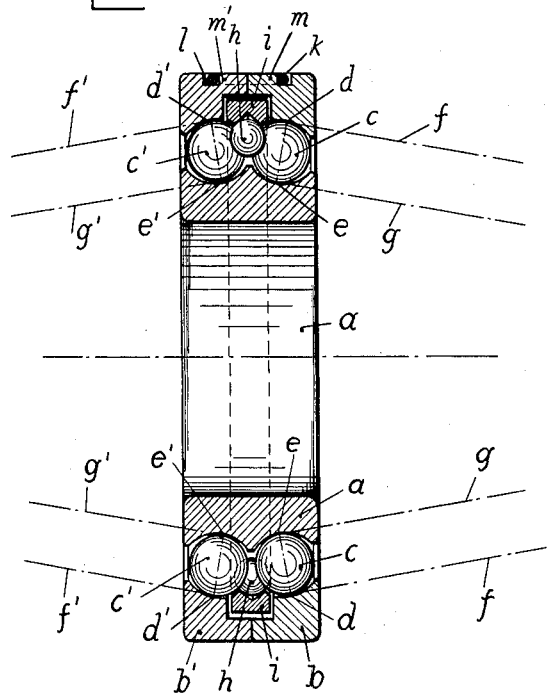
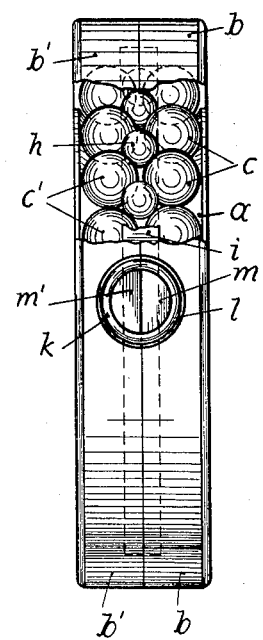
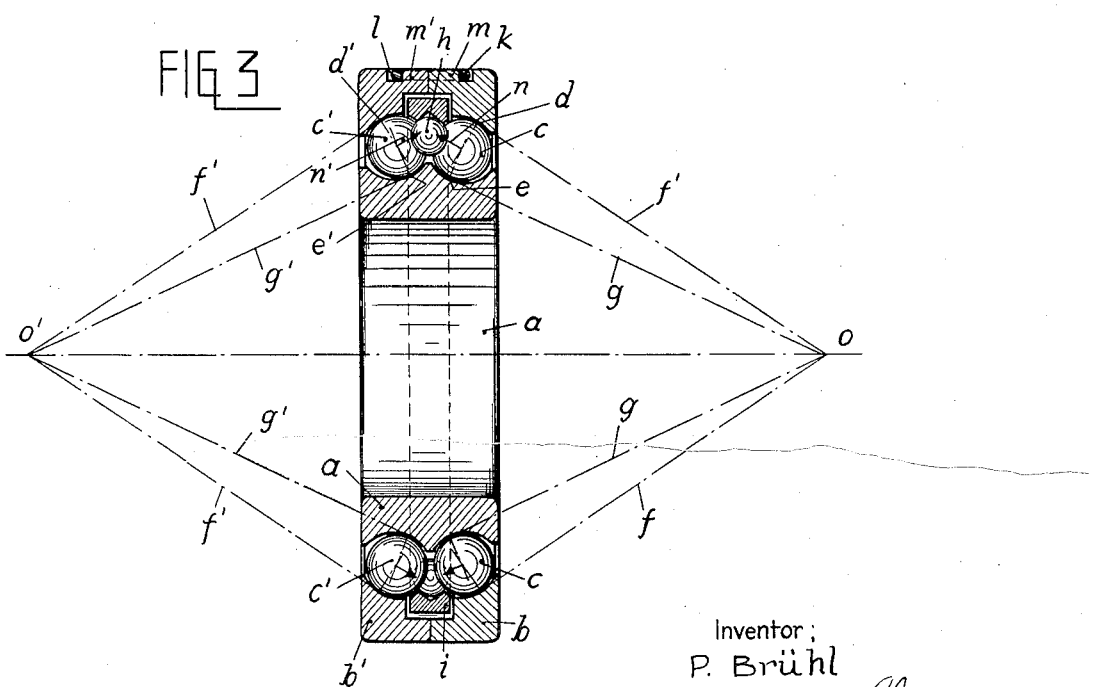
Inventor;
P. Brühl
by Marks & Clerk
Attys.

UNITED STATES PATENT OFFICE 1,953,550

ANTIFRICTION BEARING

Paul Brühl, Berlin-Lichtenberg, Germany, assignor to Max Staub, Calcutta, British India Application June 20, 1932, Serial No. 618,339
In Germany June 20, 1931

3 Claims. (Cl. 308—260)

My invention relates to antifriction bearings, and more particularly to bearings with inner and outer race members, and a plurality of race ways between them. Antifriction members are arranged in a row in each raceway, and antifriction spacing members arranged intermediate the antifriction members in each two adjacent raceways.

It is an object of my invention to improve a bearing of this general type.

To this end, I provide means for forcing radially inwards the spacing members which in turn force the antifriction members in the raceways away from each other and eliminate their slack in the race-ways.

By way of example, I shall illustrate and describe ball bearings with double raceways but it is understood that I am not limited to ball bearings and not to any definite number of raceways.

By designing an antifriction bearing according to my invention, the elimination of slack renders it particularly suitable for very heavy loads and very high speeds, and the bearing runs very smoothly.

Bearings designed according to my invention are equally suitable for push fit and for force fit on their shafts, and the operation of the bearing is not influenced by the character of the fit. In conformity with the more or less tight fit, the antifriction members are forced more or less toward the central plane of the bearing when the bearing is fitted on the shaft. This is due to the fact that the means for forcing radially inwards the spacing members, normally a cage, is more or less expanded and its reaction more or less increased. In this manner the antifriction members in the raceways are automatically adjusted into the proper position between the races, and the good running condition of the bearing is conserved even under very heavy force fits.

Obviously the displacements and deformations referred to are quite small.

For good running and high bearing capacity of bearings according to my invention the diameter of the antifriction means in the raceways should be of the order of 1.6 times the diameter of the spacing members.

It is another object of my invention to so design a bearing of the type referred to that it will yield to shocks and the excessive stress resulting therefrom.

To this end, I divide the outer race member and provide resilient means for holding its parts engaged with each other.

In a preferred embodiment of a bearing having a divided outer race as described, the two parts are connected by preferably annular connecting members which are distributed over the perimeter of the outer race and possess a limited degree of resiliency.

By these means the hardened and ground inner face of the outer race is conserved in its proper shape as required for a precision bearing, notwithstanding the resilient connection of the two parts.

If in a bearing having a divided outer race as described, excessive stress is exerted on the races by the antifriction means, the stress will be absorbed without damage to the bearing as under an axial thrust exceeding the normal force, the parts of the outer race move apart slightly against the reaction of their resilient connecting members.

The resilient connecting members may be modified in various ways and are preferably distributed over, and sunk in, the outer perimeter of the outer race.

In the accompanying drawing, two types of ball bearings embodying my invention are illustrated by way of example.

In the drawing

Fig. 1 is an axial section,

Fig. 2 is an elevation, with the outer race and the cage for the spacing antifriction members partly broken away, of the first type, and Fig. 3 is an axial section of the second type.

Referring now to the drawing, $a$ is the inner race member and $b$, $b'$ are the parts of the outer race member which is divided on the central plane of the bearing. The balls in the raceway at $b$ are $c$, and the balls in the raceway at $b'$ are $c'$.

By way of example, cageless ball bearings are shown which have the advantage that there are more balls per raceway than in a bearing having a cage, and the bearing capacity of the bearing is high.

$h$ are spacing balls, of known type, which are inserted between the rows of balls in the raceways and are much smaller than these balls, preferably at the rate of 1 by 1.6, as mentioned. $i$ is the cage of the spacing balls $h$ which is centered in any suitable manner so that it is not displaced radially to any appreciable extent when the bearing rotates. The balls $c$, $c'$ are pitched very near together axially and the separating or spacing balls $h$ may even be so arranged that the balls $c$, $c'$ are in contact. The cage $i$ for the spacing balls $h$ is comparatively thin and its inside diameter is so determined that it bears on the spacing balls $h$ with a certain tension, forcing the spacing balls in between the balls $c, c'$ so that the latter are moved apart and are applied to their raceways without clearance.

$k$ are the connecting members for the two parts of the divided outer race member $b, b'$ which may be split or closed and slightly resilient rings in grooves $l$ in the outer perimeter of the outer race member, preferably circular, with semicircular cores $m, m'$ for the inner faces of rings $k$ to bear on. The rings are distributed over the perimeter of the outer race member. For instance, there may be three rings which are preferably pitched at unequal respective distances so that the two parts of the outer race member can be assembled only in a definite relative position.

Referring now particularly to the first type illustrated in Figs. 1 and 2, the balls $c$ bear on the inner race member $a$ at $e$, and on the outer race member part $b$ at $d$, and $e', d'$ are the corresponding points for the balls $c'$. Tangents to the raceways in the points where the balls bear on the raceways, are substantially parallel, as shown at $f, g$ for the points $d, e$ and at $f', g'$ for the points $d', e'$. The angle the pairs of parallel tangents include with the axis of the bearing, is quite small.

If the bearing in Figs. 1 and 2 is placed on a shaft at force fit, the balls $c, c'$ are forced slightly inward by the inner race member $a$ and now bear on their respective raceways in such manner that the tangents are at a somewhat more acute angle than in the bearing in its unfitted condition, as shown in Fig. 1. The tension of the cage $i$ is increased to some extent as the spacing balls $h$ are forced radially outwards by the balls $c, c'$.

Referring now to Fig. 3, in this type the tangents $f, g$ and $f', g'$ form cones, with their apices at $o$ and $o'$, respectively, on the axis of the bearing. In this type, resultant forces act on the balls $c$ and $c'$ in the direction of the arrows $n$ and $n'$, respectively which tend to move inwards the balls $c, c'$. The extensions of the arrows $n$ and $n'$ go through the points $o$ and $o'$, respectively. The forces in the direction of arrows $n, n'$ are absorbed by the spacing balls $h$ on which cage $i$ exerts a certain reaction.

In both types owing to the fact that the parts $b, b'$ of the outer race are resiliently connected by the rings $k$ they can move apart for a slight amount when the axial thrust exerted by the balls $c, c'$ exceeds a certain limit, the amount being only a few hundredths of a millimetre, but this is enough for reducing to a minimum the action of a shock on the bearing. When the excessive stress ceases, the parts of the outer race return into their initial position by the reaction of rings $k$ in which the end faces of the two parts $b, b'$ make a perfectly tight fit.

I claim:

1. A multiple row ball bearing with suitable race members having race-ways, comprising rows of bearing balls and spacing balls arranged between the rows of bearing balls, said spacing balls being adapted to rotate with the rows of bearing balls, a guide ring surrounding said spacing balls, said guide ring forcing the spacing balls radially inwards with such a tension that the bearing balls are forced positively laterally outward to such an extent that they lie absolutely without clearance between the two bearing race members.

2. A multiple row ball bearing according to claim 1, in which, in the case of a not built-in bearing, the tangents at the contact points of each bearing ball lie with their two inclined race-ways substantially parallel, the race-ways being curved in such a manner that the bearing balls are forced by the inner race member toward the center of the bearing with the inner race member positioned on the shaft and the race-ways come in contact so that the tangents at the contact points enclose a more acute angle than heretofore while at the same time the tension of the guide ring for the spacing balls become greater than heretofore.

3. A multiple row ball bearing according to claim 1, with at least one race member divided transversely to the axis of the bearing into two parts, resilient split rings adapted to hold the two parts of said race member together, said rings having slight resiliency and being distributed over the periphery of the race member and countersunk therein so as not to project beyond the peripheral surface.

PAUL BRÜHL.